(No Model.)
H. FRASCH.
PROCESS OF AND APPARATUS FOR REFINING AND PURIFYING PETROLEUM.
No. 448,480. Patented Mar. 17, 1891.
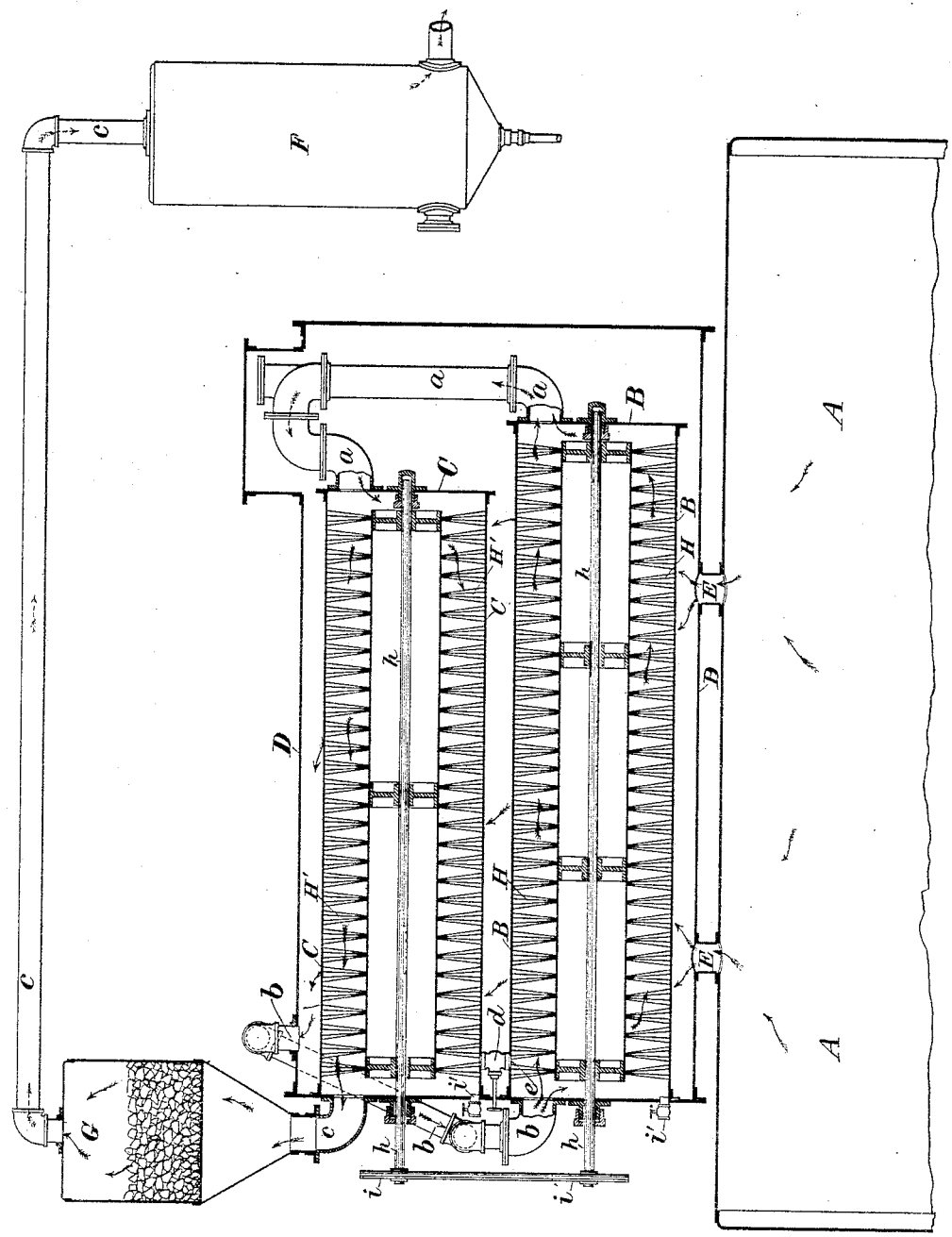
WITNESSES
INVENTOR
Herman Frasch
by his attorneys
W. Bakewell & Sons

UNITED STATES PATENT OFFICE.

HERMAN FRASCH, OF CLEVELAND, OHIO, ASSIGNOR TO THE SOLAR REFINING COMPANY, OF OHIO.

PROCESS OF AND APPARATUS FOR REFINING AND PURIFYING PETROLEUM.

SPECIFICATION forming part of Letters Patent No. 448,480, dated March 17, 1891.

Application filed October 21, 1889. Serial No. 327,637. (No model.)

*To all whom it may concern:*

Be it known that I, HERMAN FRASCH, of the city of Cleveland, in the county of Cuyahoga and State of Ohio, have invented a new and useful Improvement in Processes of and Apparatus for Refining and Purifying Petroleum, of which the following is a full, clear, and exact description.

There is a certain description of crude petroleum found in Canada and in Lima, Ohio, and other places in the United States, which contains certain sulphur compounds which are so refractory as to refuse to yield to the ordinary plumbate-of-soda treatment or to any of the ordinary methods employed for the desulphuration of liquid and gaseous bodies. These oils are distinguished by such a penetrating and disagreeable odor that the sulphur compound which they contain has come to be known as "skunk." This offensive odor has been removed by what is known as the "plumbate-of-soda treatment;" but this does not eliminate the skunk, which reappears whenever the deodorized oil is subjected to heat, as in distillation or burning in a lamp, showing that something more is requird than merely to render the oil sweet or free from its offensive smell.

My present invention consists in an improved process for treating vapor arising from the distillation or vaporization of skunk-bearing petroleum with comminuted metallic oxides or compounds containing oxides—such as oxides of copper or of lead—which under the influence of heat and agitation display such a peculiar affinity for the skunk as to break up those compounds and form new combinations in which the sulphur is eliminated from the petroleum, and also in certain apparatus for carrying my improved process into practical application.

By means of my improved process I am enabled successfully to produce a petroleum distillate direct from Lima crude oil and similar crude petroleums or their distillates free from the peculiar characteristic odor of ordinary Lima oil distillate and having all the good qualities of the best Pennsylvania burning-oil distillate. By this improved process, as applied to crude skunk-bearing oil I also avoid the dissemination in the process of treatment of the excessively offensive odor arising from the ordinary process of distilling Lima crude oil, because by my process I bind the skunk compounds contained in the crude Lima oil, so that the first distillate is free from offensive odor and no second distillation is necessary. This in itself reduces the cost of production, as it saves one step of the process and avoids the necessity of using an auxiliary still; but a more important advantage incident to my invention is that where my improved process is applied to Lima crude instead of to Lima distillate the corrosive action of the sulphur in the Lima distillate on the pipes, stills, and tanks is entirely avoided, and further the works at which my process of treating Lima oil is used are no more offensive to the public than works in which the ordinary process of distilling Pennsylvania oil is carried on.

Although my improved process and apparatus are specially advantageous when applied to the treatment of crude skunk-bearing oils, yet there is nothing to prevent their use as applied to any distillate of such oils. I therefore do not confine my invention to the treatment of crude oil of the character referred to.

The accompanying drawing illustrates my improved apparatus in longitudinal vertical section.

In the drawing, A is a still adapted for the distillation of crude petroleum or the redistillation of petroleum distillates. The still may be of any desired construction, such that the vapors of distillation may pass off through pipes E E into the purifying apparatus. This apparatus consists chiefly of two cylindrical purifying-vessels B C, placed horizontally one above the other within an outer casing or shell D, somewhat after the manner of a horizontal steam-boiler with flues. These cylindrical vessels B C (which I shall call for convenience "cylinders") may be about twelve to fourteen feet in length and five feet in diameter, the dimensions stated in this specification being merely given as suggestive of convenient relative size. The lower cylinder B is preferably somewhat longer than the upper cylinder C. The forward ends of the cylinders may project slightly beyond the front end of the casing D or be flush therewith, as in the drawings, while the rear ends of the cylinders should be inclosed within the casing, so that they may be connected by a pipe *a*, located within the vapor-space of the casing D. The upper portion of the connecting-pipe *a* before it enters the upper cylinder C should be bent so as to rise above the level of the top of the cylinder to prevent the flow of its liquid contents down to the lower cylinder B. The casing D is placed horizontally and is connected with the vapor-space of the still A by a pipe or pipes E, the casing D and its cylinders being placed above the still, so that any vapor which may condense in the casing may run back into the still.

The vapor-space of the casing D is connected with the interior of the lower cylinder B by a pipe *b*, leading from the top of the casing to the upper part of the cylinder, and a pipe *c* leads from the upper part of the upper cylinder C to the condenser F, which may be of any desired construction. From this arrangement of parts it follows that the petroleum vapor arising from the crude petroleum in the still A must pass by the pipes E E into the casing D, thence, following the course of the arrows around the cylinders B and C, through the pipe *b* (out of the casing) into the upper part of the lower cylinder B, thence through cylinder B by pipe *a* into cylinder C, and thence by pipe *c* to the condenser F. To the pipe *c* is connected a filter G, so located that the vapor must pass through it on its way to the condenser. This filter is simply a vessel having a perforated bottom, which is filled with loose broken stone, which is placed in the path of the pipe *c* or otherwise communicates with the last cylinder and with the condenser, the function of the filter being to arrest the passage to the condenser of any particle of matter which may be mechanically carried over from the cylinder by the vapor of distillation, such as particles of undissolved oxide or particles of sulphide from the cylinder. A small portion of the vapor passing from the cylinder is condensed by the stone in the filter, which, percolating through, carries back to the cylinder the solid particles deposited therein, so that the filter continually purifies itself.

Within each of the cylinders B C is a wire brush H H′, attached to the revolving shaft *h*, at the end of which is a gear-wheel or sprocket-wheel *i*, these gear-wheels being revolved by any suitable mechanical device. The brushes H H′ are of like construction, each consisting of a light iron cylinder perforated with holes, and in each hole is inserted and fastened the bent portion of a number (say four) of steel wires. These wires may be of such length that their ends are in contact with the inner surface of the cylinder, but should at least be in close proximity thereto. At the front end of the upper cylinder is a short pipe *i*, through which the desulphurizing compound is pumped into the upper cylinder C by a force-pump, or in any other convenient manner, and runs from the upper cylinder into the lower one through a connecting-pipe *e* until the lower one is about half-full, when the connection is closed by a cock *d*, and the upper cylinder is in like manner filled about half-full. After the cylinders have been once charged the lower cylinder, when the run of oil is finished, is emptied by the pipe *i*′ of its liquid or semi-liquid contents, consisting of particles of sulphide which are held in suspension in the petroleum, or which have been precipitated, and any unspent solution and undissolved oxide which may remain in the lower cylinder. The contents of the upper cylinder are then run into the lower cylinder, filling it about half-full, and then the connection being closed the upper cylinder is charged with fresh solution or mixture. Thus the petroleum-vapor passes first in contact with the desulphurizing mixture which has been used during the prior run in the upper cylinder, and then in contact with the fresher mixture in the upper cylinder, which removes any sulphur which has remained unreduced in its passage through the lower cylinder.

The operation of my improved apparatus is as follows: The desulphurizing compound, which may be a comminuted metallic oxide dissolved in some of the petroleum to be treated, to which is added an additional amount of oxide beyond the amount which the oil will dissolve, so as to reach the condition of saturation, forming a semi-liquid solution and mixture, which I call "desulphurizing compound," is charged into the cylinder B and cylinder C, as just described, until they are about half-full. When the petroleum vapor of distillation begins to rise from the still, filling the vapor space of the casing D and passing into the lower cylinder through the pipe *b*, the brushes in the cylinders are caused to rotate on their axes, the speed of rotation being about thirty revolutions a minute, although this may be varied as desired. The vapor after being treated in the lower cylinder passes through pipe *a* into the upper cylinder C, the action of the brushes being the same in both. As the wire bristles of the brushes pass through the desulphurizing mixture they are coated with a thin film of the solution of the metallic oxide in petroleum, and so coated they pass through the petroleum-vapor from the still. As the solution runs down the bristles its surface is continually changing, bringing fresh oxide solution in contact with the vapor. The purifying agent in the solution has so strong an affinity for the sulphur of the skunk in the vapor that the skunk is broken up, the sulphur forming a sulphide of the metal, which, being insoluble in the petroleum, is precipitated in solid particles. The liquid in the cylinder on parting with the oxide held in solution takes up fresh oxide previously held in suspension in the liquid, as before stated, for that purpose, and thus these described reactions are continually going on—namely, the sulphur leaving the skunk of the petroleum-vapor and uniting with the metallic base of the oxide, forming a sulphide, and the liquid petroleum taking up fresh oxide into solution. By these means I secure the best possible conditions for effecting the desulphuration of the oil—namely, that the oil to be treated shall be in a condition of vapor, so as more readily to part with its sulphur, and that the oxide shall be in a state of solution, which is very important as with most of the metallic oxides the reaction is very slight unless the oil is in a condition of vapor, so as more readily to part with its sulphur.

The treatment of the skunk-bearing petroleum in a vaporous condition by means of desulphurizing liquid passed through the vapor in the manner described is decidedly more advantageous than the mixing of the desulphurizing material with the liquid oil in the still during the process of distillation or than the passing of the petroleum-vapor through the body of comminuted metal or metallic oxides.

As the petroleum-vapor passes from the lower cylinder into the upper cylinder, in which the mixture is fresher, any remaining sulphur compounds are effectually broken up by the combination of the sulphur with the metal in the formation of the oxide. By this means the formation of sulphurous fumes is prevented, and not only is the result better as far as the product is concerned, but the difficulty ordinarily experienced of the production of the persistent and highly-offensive odor of sulphurous vapors is avoided, rendering the entire process even more inoffensive and innoxious than that of the distillation of ordinary petroleum.

The length of time during which the process should be continued obviously depends chiefly on the capacity of the still and varies from twenty-four hours to two or three days.

It is obviously not necessary to use two cylinders and brushes, as a single cylinder and brush would suffice, although it is preferable to use two for the reasons before stated. One or more such cylinders might also be connected with the vapor-space of the still, and, if more than one, with each other, without the use of the casing or vapor-chamber D, but not so efficiently, in my opinion. I also desire to state that by the terms "cylinder," "casing," "brushes," and "still" in the specification and claims I do not intend to limit my invention to a cylindrical shape for the first-named, nor to the exact described construction of the others. The brushes, for example, might be furnished with rods instead of steel bristles, or even with paddles or disks; but I consider the construction I have described as the preferable one.

Having thus described my improvement, what I claim as my invention is—

1. The process of removing from petroleum the sulphur compound known as "skunk," consisting in vaporizing the petroleum and passing the vapors through a vessel containing an oily liquid holding in solution, or solution and suspension, a substance soluble in such petroleum and having an affinity for the skunk compound, and raising the solution into contact with the vapors above the liquid by causing a device to enter repeatedly into and agitate the liquid and raise upon the surface of the device a portion of the liquid into the space occupied by the vapors, substantially as described.

2. The combination of a still for vaporizing petroleum and one or more cylinders arranged so as to connect with each other and with the vapor-space of the still, each cylinder containing a revolving brush, the cylinders being located within a chamber through which the hot vapors from the still pass before entering the cylinders, substantially as described.

3. The combination of the still A, the casing D, connected therewith, the cylinders B and C within the casing, a revoluble brush H within each cylinder, a pipe E, connecting the still and casing, a pipe b, connecting the casing and cylinder B, a pipe a, connecting the cylinders B C, a condenser, and a pipe c, connecting the cylinder C and the condenser, substantially as described.

4. The combination, with a vaporizing-still, of a cylinder or cylinders connected with the vapor-space of the still and each inclosing a revolving brush, a condenser, and a connection between the cylinders and condenser, substantially as described.

5. The combination, with a vaporizing-still, of a cylinder or cylinders connected with the vapor-space of the still and adapted to retain liquid therein and inclosing a revolving brush arranged to dip into the liquid, a condenser, and a partially-condensing filter having its inlet connected with said cylinder or cylinders and its outlet with said condenser, substantially as described.

In testimony whereof I have hereunto set my hand this 28th day of August, A. D. 1889.

HERMAN FRASCH.

Witnesses:
F. W. LOTHMAN,
W. BAKEWELL.